US012236102B2

(12) United States Patent
Salamon

(10) Patent No.: US 12,236,102 B2
(45) Date of Patent: Feb. 25, 2025

(54) REDUNDANCY-AWARE COORDINATION OF STORAGE SYSTEM EVENTS

(71) Applicant: Dell Products L.P., Round Rock, TX (US)

(72) Inventor: Victor Salamon, Edmonton (CA)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 17/507,854

(22) Filed: Oct. 22, 2021

(65) Prior Publication Data

US 2023/0130435 A1 Apr. 27, 2023

(51) Int. Cl.
*G06F 3/06* (2006.01)

(52) U.S. Cl.
CPC .......... *G06F 3/0617* (2013.01); *G06F 3/0635* (2013.01); *G06F 3/0653* (2013.01); *G06F 3/067* (2013.01)

(58) Field of Classification Search
CPC .... G06F 3/0617; G06F 3/0635; G06F 3/0653; G06F 3/067
See application file for complete search history.

(56) References Cited

U.S. PATENT DOCUMENTS

| | | | | |
|---|---|---|---|---|
| 5,907,696 A * | 5/1999 | Stilwell | ................. | H04L 41/046 703/13 |
| 7,389,379 B1 * | 6/2008 | Goel | ................... | G06F 11/1662 714/6.32 |
| 8,286,015 B2 * | 10/2012 | Olarig | ................... | G06F 3/0625 713/323 |
| 10,013,325 B1 * | 7/2018 | Garrett, Jr. | .......... | G06F 11/0727 |
| 2013/0117603 A1 * | 5/2013 | Jess | ..................... | G06F 11/1443 714/E11.041 |
| 2014/0068627 A1 * | 3/2014 | Goh | ...................... | G06F 9/5094 718/105 |

(Continued)

OTHER PUBLICATIONS

VPlex: Severe write latency on VPlex distributed devices due to backend performance issues, Dell Technologies, Article No. 000168565, Dec. 21, 2020, Available at "https://www.dell.com/support/kbdoc/en-id/printview/000168565/10/en", last access Oct. 21, 2021.

*Primary Examiner* — Eric T Loonan
(74) *Attorney, Agent, or Firm* — Ryan, Mason & Lewis, LLP

(57) ABSTRACT

Methods, apparatus, and processor-readable storage media for coordinating storage system events are provided herein. An example method includes generating a representation of a set of components associated with a storage system comprising information corresponding to at least one data mirror in the set and at least one path associated with the set; obtaining a request from a given component in the set to perform an action that affects one or more of: at least one data mirror and at least one path; determining, based at least in part on the generated representation, whether the action will reduce a redundancy of the storage system to below a threshold level of redundancy specified for the storage system; and providing, to the given component, a response based at least in part on a result of the determining, wherein a performance of the action is controlled based at least in part on the response.

20 Claims, 7 Drawing Sheets

(56) References Cited

U.S. PATENT DOCUMENTS

| | | | | |
|---|---|---|---|---|
| 2014/0152476 A1* | 6/2014 | Oggier | ................ | H03M 13/373 |
| | | | | 341/94 |
| 2019/0384499 A1* | 12/2019 | Danilov | .............. | G06F 11/1076 |
| 2020/0136894 A1* | 4/2020 | Bush | ......................... | H04L 1/08 |
| 2020/0349004 A1* | 11/2020 | Ma | ........................ | G06F 3/0644 |
| 2023/0089663 A1* | 3/2023 | Shankar | ................ | G06F 3/0659 |

* cited by examiner

REDUNDANCY-AWARE COORDINATION OF STORAGE SYSTEM EVENTS

FIELD

The field relates generally to information processing systems, and more particularly to improving data availability in such systems.

BACKGROUND

Storage systems, such as storage area networks (SANs), often include webs of connections between applications and data. Adding redundancy to the connections and the data can improve throughput and availability. However, planned and/or unplanned events by components of the storage system can reduce redundancy and, in some cases, even cause the data to become unavailable. Existing solutions fail to adequately protect against such events.

SUMMARY

Illustrative embodiments of the disclosure provide techniques for coordinating storage system events. In one embodiment, an exemplary computer-implemented method can include generating a representation of a set of components associated with a storage system, the representation comprising information corresponding to one or more data mirrors in the set and one or more paths associated with the set of components, wherein the one or more paths comprise one or more of: at least one data path and at least one control path; obtaining a request from a given component in the set to perform an action that affects one or more of: at least one of the one or more data mirrors and at least one of the one or more paths; determining, based at least in part on the generated representation, whether the action will reduce a redundancy of the storage system to below at least one threshold level of redundancy specified for the storage system; and providing, to the given component, a response based at least in part on a result of the determining, wherein a performance of the action is controlled based at least in part on the response.

In at least some embodiments, the techniques for coordinating storage system events use a witness system comprising a path and data witness.

Illustrative embodiments of the disclosure can provide significant advantages relative to conventional storage techniques. For example, challenges associated with data availability are mitigated in one or more embodiments by using a path and data witness to globally coordinate events between storage system elements based on a specified level of data and/or connection redundancy. These and other illustrative embodiments described herein include, without limitation, methods, apparatus, systems, and computer program products comprising processor-readable storage media.

DETAILED DESCRIPTION

Figure 1:
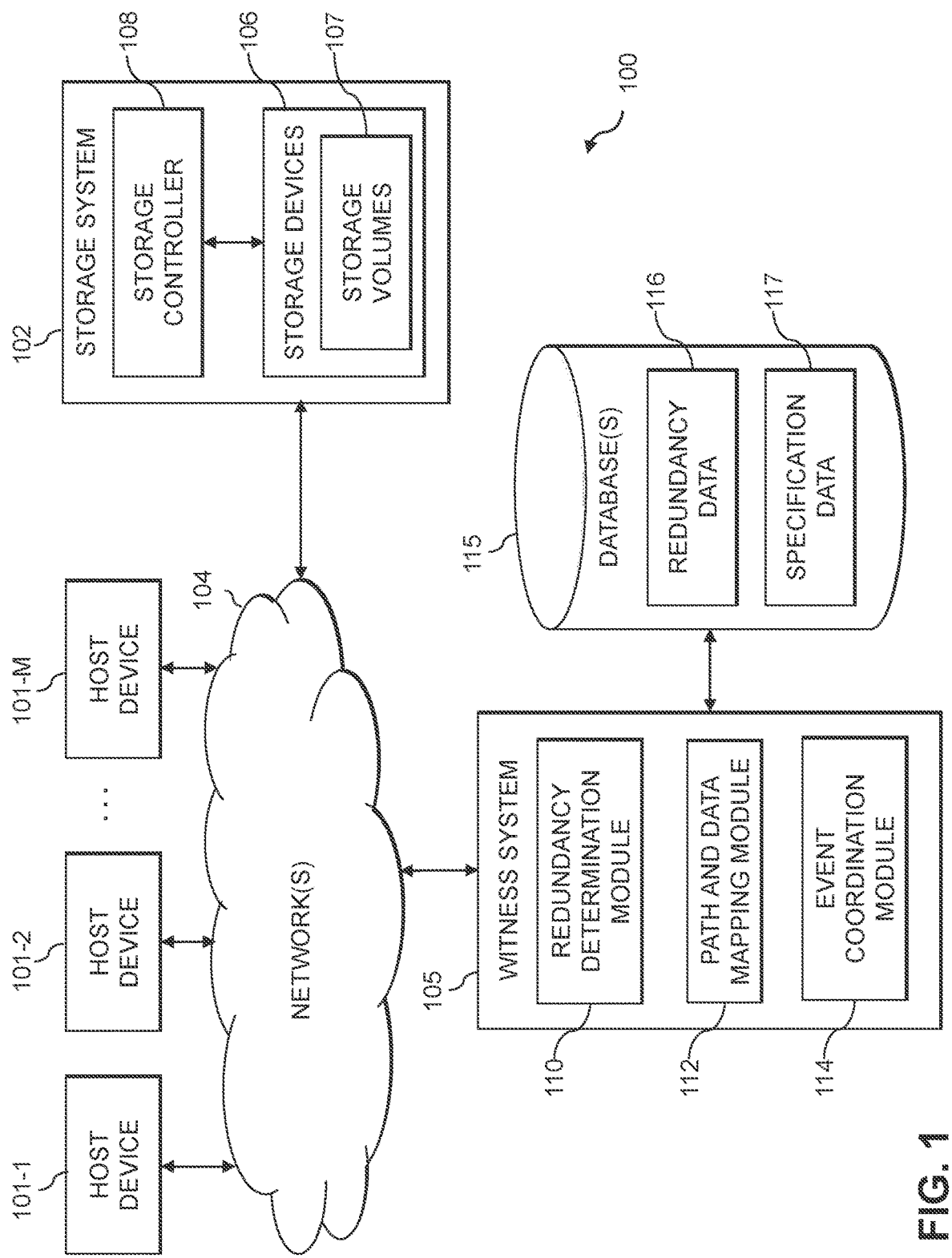
FIG. 1 shows an information processing system configured for coordinating storage system events in an illustrative embodiment of the disclosure.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Storage systems often include various levels of redundancy in network and data storage elements. Such redundancy can provide extra bandwidth and protection for hosts, networks, or data in case of an event that might impact availability of an application or data. For example, a storage system may employ redundant physical elements, including redundant hosts (potentially using different operating systems and input-output (IO) drivers); redundant IO paths; redundant mirrors for data storage; and redundant ports associated with at least some of the hosts, IO paths (also referred to herein as data paths), and/or mirrors. The redundant data paths may be between hosts and storage controllers (locally or remotely), between controllers (for example, storage or network controllers) that coordinate data copies and control messages across one or more networks (for example, a wide area network (WAN) and a local area network (LAN)), or between storage controllers and storage volumes (locally or remotely).

Storage and network controllers can be independently installed in the SAN or embedded (for example, in a storage array). It is common for large and complex storage systems to have storage elements from multiple different vendors with different supporting teams.

In case of a malfunction or congestion, storage paths or logical units (LUNs) can negatively impact the performance of a business application, sometimes to the point of introducing an application unavailability condition. Data unavailability conditions can occur when an IO or control path is affected. For example, IO paths experience performance issues due to congestion, faulty optical cables, or other interference, for example. A storage array (or any of its ports) or a data mirror storage leg may malfunction due to physical, software, or environmental problems, for example.

To avoid application or data unavailability conditions, some SAN elements implement auto-isolation features that isolate underperforming elements. Auto-isolation features can be implemented in the drivers of substantially all of the storage elements (network paths, virtual mirrors) to cut off particular storage elements. Some auto-isolation features may monitor the performance metrics (for example, latency or throughput) of a critical path (for example, an IO or control path) and disconnect or isolate particular elements from the SAN path that are underperforming. By way of example, the performance of a given storage mirror can be monitored relative to the performance of other storage mirrors, and if the given storage mirror is performing slowly (determined based on one or more criteria), then the given storage mirror can be disconnected, or its usage can be lowered when data availability to a corresponding application is threatened. When a mirror is disconnected, a background process can monitor the performance of the disconnected mirror, and reconnect the mirror when its performance improves sufficiently. The mirror is rebuilt based on the differences between the other mirrors, for example.

As another example, the performance of initiator-target paths (ITs) and initiator-target-LUN paths (ITLs) can be monitored, and a given path can be disconnected and/or offloaded if the path is congested or underperforming relative to other redundant ITs/ITLs. A disconnected (or offloaded) path is then retested to determine if the path should be reconnected based on a set of reconnection performance metrics.

In order to maintain availability of applications and data, components of storage networks generally require redundancy. For example, if an array having a particular number, X, of IO ports needs to perform an upgrade process, then a subset of the X ports can be disconnected to upgrade the drivers. The disconnected ports are then brought back online, and then the remaining ports may be upgraded. This allows the application and data to remain available during the upgrade process. Similar processes can also be used to upgrade port controllers in an array, directors in a cluster, and firmware on a network switch, for example. In addition to upgrades, components of a storage system also may need to be reset for other reasons. For example, some field procedures call for reseating motherboards, or hardware resets, or pulling cables to work around an environmental problem. These types of maintenance activities also may require redundancy to avoid unavailability conditions.

It is often difficult to implement redundancy in storage systems, particularly for storage systems having components from multiple different vendors. Also, even if auto-isolation features are properly configured, such features make decisions for individual components without considering the effect the decision will have on the storage system as a whole. Thus, these local decisions can inadvertently induce unavailability conditions.

As an example, assume a storage network includes a host device, a network controller, and a storage controller. The network controller and the storage controller each have two ports, where ports 1 and 2 of the network controller are connected to ports 3 and 4 of the storage controller, respectively. Now assume an issue arises that affects the performance of port 4 of the storage controller, but port 3 is unaffected. The storage controller decides to stop using port 4 since port 3 is still available. At substantially the same time, assume a node associated with the network controller brings down port 1 to initiate an upgrade, thereby leading to a data unavailability condition. These types of unavailability conditions are avoidable if the network controller and the storage controller coordinate their respective actions such as by delaying the upgrade process for port 1 or continuing to use port 4, for example. Although this example involves two intentional downing/isolation events (namely, a manually-induced upgrade and an automated isolation action), those skilled in the art will appreciate that similar situations may occur through combinations of intentional isolation/downing events, unintentional isolation/downing events, and/or insufficient redundancy configurations. Unintentional events may include, for example, physical, software, or environmental failures, and intentional events may include actions taken by auto-isolation features based on one or more performance metrics and actions associated with maintenance and/or upgrade processes. Events or actions that affect a redundancy of a data path and/or a data mirror are generally referred to herein as disruptive events.

Illustrative embodiments herein describe techniques that reduce unavailability conditions by coordinating storage system events based on a path and data witness.

FIG. 1 shows an information processing system 100 configured in accordance with an illustrative embodiment. The information processing system 100 comprises a plurality of host devices 101-1, 101-2, . . . 101-M, collectively referred to herein as host devices 101, a witness system 105, and a storage system 102. The host devices 101, the storage system 102 and the witness system 105 are configured to communicate with each other over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate IO operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

Additionally, the witness system 105 is assumed to be implemented using at least one processing device. Each such processing device generally comprises at least one processor and an associated memory, and implements one or more functional modules for controlling certain features of the witness system 105.

In the FIG. 1 embodiment, the witness system 105 includes a redundancy determination module 110, a path and data mapping module 112, and an event coordination module 114. The witness system 105 is an example of a path and data witness, as described herein. The redundancy determination module 110, in some embodiments, determines a level of redundancy (for example, data and/or connection redundancy) associated with the storage system 102 and host devices 101, for example. The path and data mapping module 112, in some embodiments, maps data paths between the host devices 101 and the storage system 102. Also, the event coordination module 114 obtains indications of disruptive events that affect at least one of the data paths, and prevents a given one of the planned events from occurring when the level of redundancy will be reduced to an unacceptable level, as described in more detail below.

It is to be appreciated that this particular arrangement of modules 110, 112 and 114 illustrated in the witness system 105 of the FIG. 1 embodiment is presented by way of example only, and alternative arrangements can be used in other embodiments. For example, the functionality associated with the modules 110, 112 and 114 in other embodiments can be combined into a single module, or separated across a larger number of modules. As another example, multiple distinct processors can be used to implement different ones of the modules 110, 112 and 114 or portions thereof.

At least portions of modules 110, 112 and 114 may be implemented at least in part in the form of software that is stored in memory and executed by a processor.

The witness system 105 can have at least one associated database 115 configured to store redundancy data 116 and specification data 117. In some embodiments, the redundancy data 116 pertain to, for example, data paths generated by the path and data mapping module 112, and the specification data 117 pertain to minimum acceptable levels of redundancy for the data paths and the data stored in the storage system 102, for example.

An example database 115, such as depicted in the present embodiment, can be implemented using one or more storage systems associated with the witness system 105. Although the redundancy data 116 and specification data 117 are shown in FIG. 1 as separate components within database 115, in other embodiments, an additional or alternative instance of the redundancy data 116 and/or the specification data 117, or portions thereof, may be incorporated into another database or the storage system 102.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101, the witness system 105, and the storage system 102 may be implemented on a common processing platform, or on two or more separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a WAN, a LAN, a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store data of a plurality of storage volumes 107. The storage volumes 107 illustratively comprise respective LUNs or other types of logical storage volumes. The term "storage volume" as used herein is intended to be broadly construed, and should not be viewed as being limited to any particular format or configuration.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell Technologies. A wide variety of other types of distributed or non-distributed storage arrays can be used in implementing the storage system 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), SANs, direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell Technologies. Other types of MPIO drivers from other driver vendors may be used.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore to be appreciated that the distributed storage controller can include one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101, the storage system 102 and the witness system 105 may be implemented in whole or in part on the same processing platform or on two or more separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in geographic locations that are remote from the first geographic location. Thus, it is possible in some implementations of the system 100 for the host devices 101, the storage system 102, and the witness system 105 to reside in two or more different data centers. Numerous other distributed implementations of the host devices 101, the storage system 102 and the witness system 105 are possible.

Additional examples of processing platforms utilized to implement host devices 101, storage system 102 and witness system 105 in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types, and arrangements of system components such as host devices 101, storage system 102, network 104, witness system 105, storage devices 106, storage volumes 107, storage controller 108, modules 110, 112, and 114, and database 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Exemplary processes utilizing modules 110, 112 and 114 will be described in more detail with reference to the flow diagram of FIG. 4.

Some of the techniques are described herein with reference to a SAN, however, those skilled in the art will appreciate that such techniques are also applicable to other types of storage systems.

Figure 2:
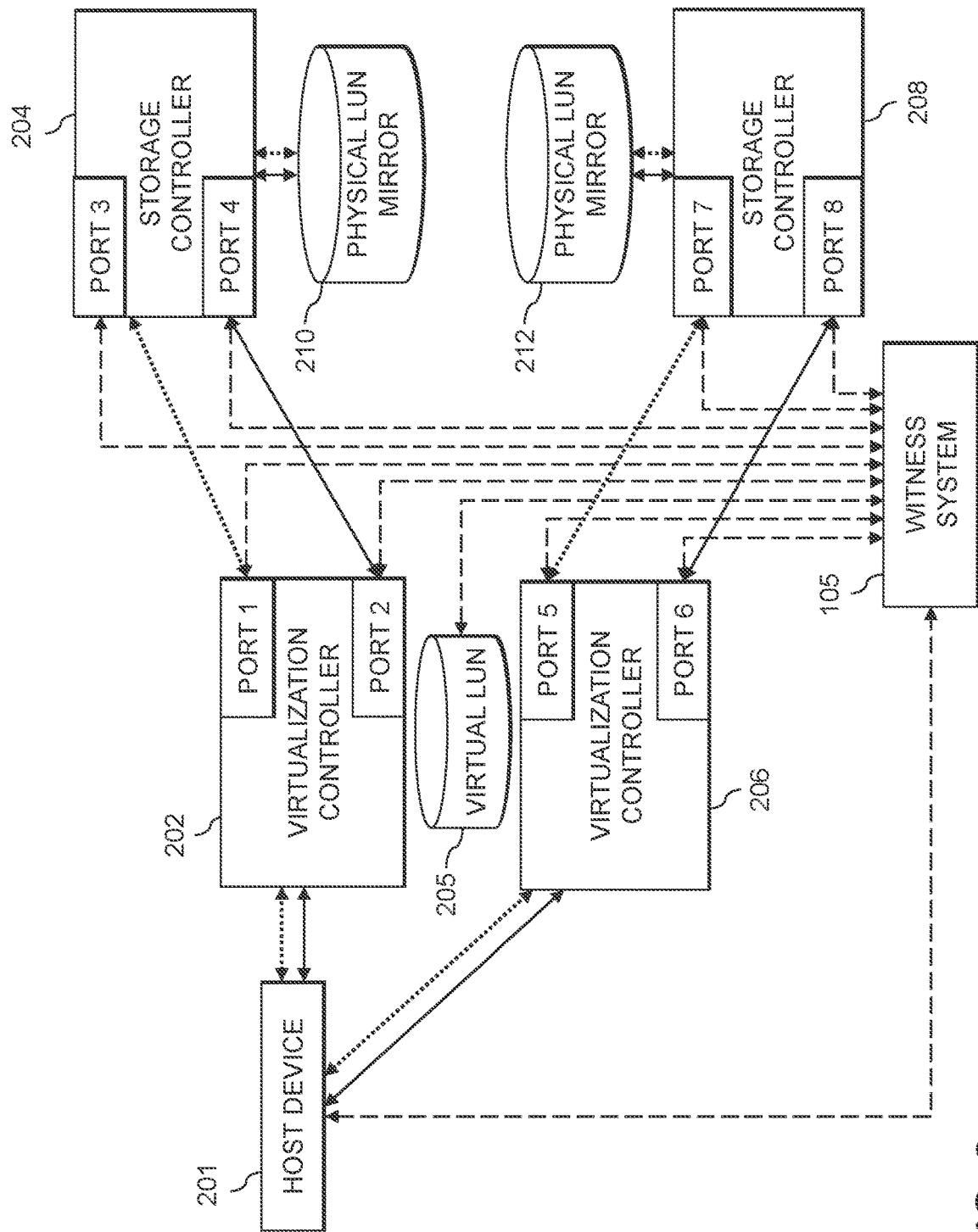
FIG. 2 shows an example of a storage network that includes a witness system in an illustrative embodiment.

FIG. 2 shows an example of a storage network that includes a witness system 105 in an illustrative embodiment. More specifically, FIG. 2 shows a SAN, having the following physical elements: host device 201, virtualization controllers 202 and 206, and storage controllers 204 and 208. The SAN also includes a virtual LUN 205 that offers a single interface to the host device 201 and is implemented on physical LUN mirrors 210 and 212. The physical LUN mirrors 210 and 212, in some embodiments, reside on different storage arrays (not shown) associated with storage controllers 204 and 208, respectively. It is assumed that an application of host device 201 can access the virtual LUN 205 using one or more of the virtualization controllers 202 and 206.

FIG. 2 also shows redundant fabrics between, for example, the host device 201 and the virtualization controller 202, and the virtualization controller 202 and the storage controller 204, which are represented by the solid arrows and dotted arrows, respectively. For clarity, certain SAN elements are not explicitly shown in FIG. 2 including, for example, the ports for the connections between the host device 201 and the virtualization controllers 202 and 206 and fabric network switches and their respective ports. The dashed arrows between the SAN elements and the witness system 105 represent communication channels configured to carry messages in both directions that are used to coordinate planned disruptive events associated with the SAN elements. It is assumed that communication channels are also configured between the witness system 105 and other components of the storage system that are not explicitly shown in FIG. 2.

The witness system 105, in some embodiments, obtains a specification of at least one minimum acceptable level of redundancy for SAN data and paths to the data. The specification may be provided as input by a system administrator to define acceptable levels of redundancy for data mirrors, physical paths to data (for example, cables), and virtual paths to data (for example, IT and ITL paths in SCSI), for example.

The witness system 105 generates a storage system-wide representation of the data mirrors and the paths to the data by gathering information from each of the SAN components. For example, the witness system 105, in some embodiments, can be implemented as a separate node (as depicted in the FIG. 2 example), or across multiple nodes for redundancy. The information used to generate the representation, in some embodiments, can be collected using storage resource management (SRM) software, if available. In other embodiments, the witness system 105 can be implemented in a controller node cluster in the network (for example, a VPLEX cluster). The cluster of controllers is aware of the connections from host devices (for example, host device 201) to the storage mirrors (for example, physical LUN mirror 210 and 212), including all of the physical and virtual port identifiers, and the IT and ITL SCSI connections between them. Based on this information, the witness system 105 can build the storage system-wide representation of the data mirrors and the paths from the hosts (or applications executing on the hosts) to the data. The storage system-wide representation, in at least one embodiment, can include mappings of all paths from the host devices (or applications executing on the host devices) to the data mirrors. As an example, a representation of FIG. 2 may include mappings of four paths (two on each fabric) between the host device 201 and physical LUN mirrors 210 and 212. The following two data paths correspond to the network fabric represented by the dotted arrows in FIG. 2:

1. Host device 201→virtualization controller 202→virtualization controller 202, port 1→storage controller 204, port 3→storage controller 204→physical LUN mirror 210; and
2. Host device 201→virtualization controller 206→virtualization controller 206, port 5→storage controller 208, port 7→storage controller 208→physical LUN mirror 212.

The other two paths correspond to the fabric represented by the solid arrows, and are similar to the paths above, except the alternate pairs of ports are used (for example, ports 2 and 4, and ports 6 and 8). The witness system 105 can store the information of the mappings and the mirrors in the database 115 as redundancy data 116. As a non-limiting example, the redundancy data 116 may include records of available data paths and mirrors, which can be updated by the witness system 105 as information about the SAN components is received, such as whether a given SAN component is up, down, degraded, affected, or isolated.

According to at least some embodiments, the various SAN elements provide notifications to the witness system 105 in response to detecting that any of the data mirrors, or the paths to them, are down or isolated. The notification can be provided, for example, using the communication channels corresponding to at least some of the dashed arrows in FIG. 2. The witness system 105, in some embodiments, analyzes the indications in view of the storage system-wide representation to determine the current redundancy level along all paths from the host(s) and the data that they access, as well as the redundancy level of the data itself.

For a planned disruptive event (for example, relating to performance metrics or an upgrade process), the corresponding SAN element checks with the witness system 105 to determine if the action can be taken. The witness system 105 determines if the action can be taken based on the current status of the storage network and whether it will cause the last remaining data path or last remaining data mirror to become unavailable. The witness system 105 may also consider the specified redundancy criteria in making this determination, as explained in more detail elsewhere herein. The witness system 105, in some embodiments, can send an acknowledgement to the SAN element that sent the request, and the SAN element can then perform the action in response to receiving the acknowledgement.

An exemplary process performed by the witness system 105 in response to receiving a request from a SAN element may include the following steps:
1. Clone the storage system-wide representation of the SAN elements.
2. Perform the proposed disruptive event, acting only on path and mirror records represented in the clone.
3. Generate a graph representing paths between the host(s)/application(s) and data storage, using the records of the clone as modified by step 2.
4. Check that each data path and data mirror set on the graph has a redundancy level higher than that specified in the specification.
5. If the generated graph indicates there is still a path to data after performing the disruptive event, and if the resulting redundancy level is acceptable according to the specification, then the witness system 105 sends an acknowledgement to the SAN element that requested this action, clearing the action to proceed.
6. If the computed graph indicates a missing path to data, or if the resulting redundancy level falls below a minimum level in the specification, then the witness system 105 sends a negative acknowledgement (NACK) to the SAN element that requested this action, denying the action from proceeding.

Such embodiments ensure that a planned action associated with a given storage system component cannot, on its own, disable or isolate the last data mirror or the last path to data.

Figure 3:
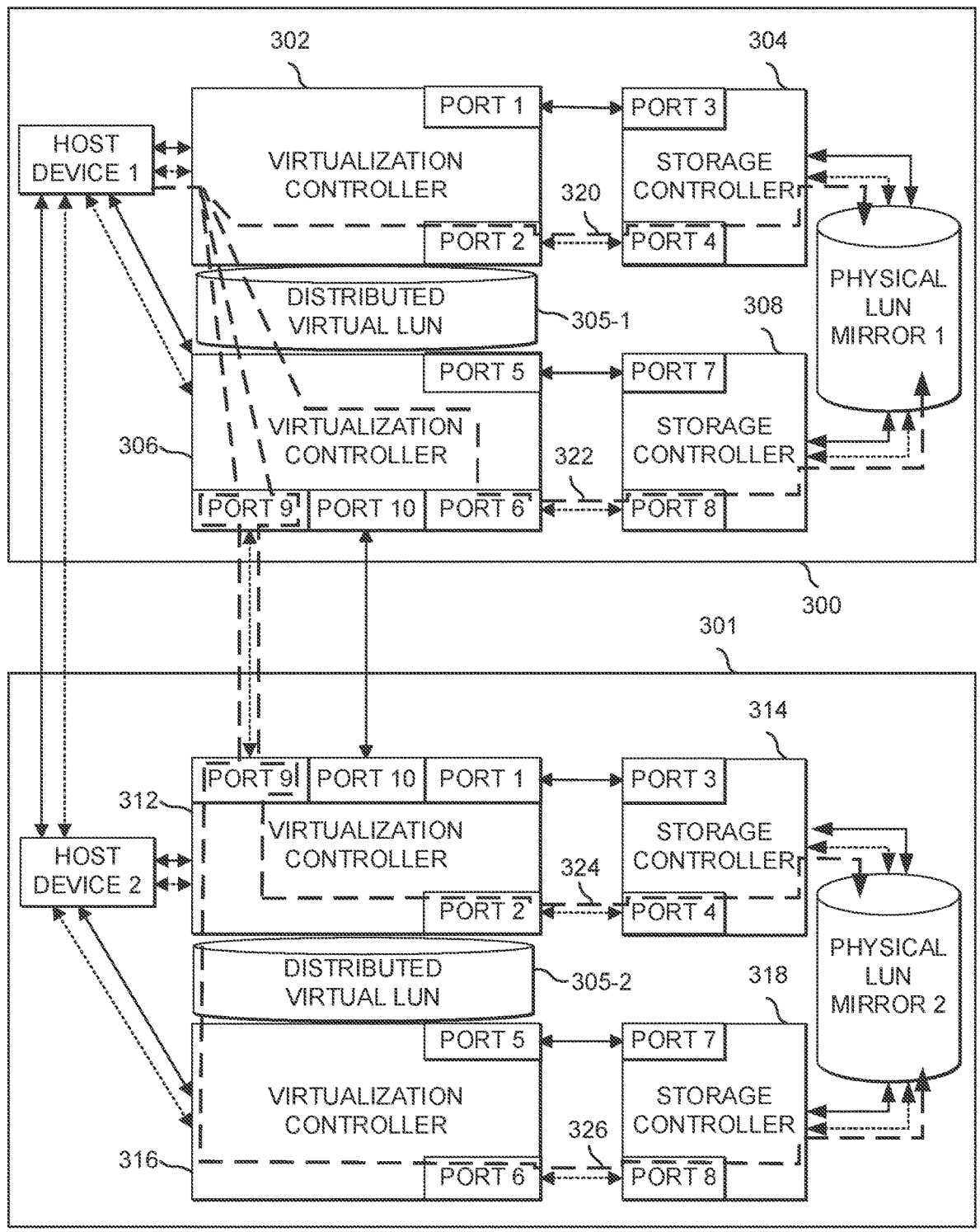
FIG. 3 shows an example of a storage network showing different data paths in an illustrative embodiment.

FIG. 3 shows another example of a storage network and corresponding data paths in an illustrative embodiment. The storage network in this example is assumed to be a SAN, in which a distributed (or clustered) application executing on two hosts (host device 1 and host device 2) is deployed. The distributed application accesses a distributed virtual LUN 305 (represented in FIG. 3 as a distributed virtual LUN 305-1 and 305-2) that is instantiated across four virtualization controllers 302, 306, 312, and 316 over two clusters 300 and 301. Each of the virtualization controllers 302, 306, 312, and 316 may correspond to a VPLEX or SRDF controller, for example. Cluster 300 also includes storage controllers 304 and 308, and physical LUN mirror 1; and cluster 301 includes storage controllers 314 and 318, and physical LUN mirror 2. Similar to FIG. 2, the dotted and solid arrows correspond to two different fabrics.

FIG. 3 also shows that: virtualization controllers 302 and 312 include ports 1 and 2; storage controllers 304 and 314 include ports 3 and 4; virtualization controllers 306 and 316 include ports 5 and 6; and storage controllers 308 and 318 include ports 7 and 8. Ports 9 and 10 of virtualization controllers 306 and 312 are assumed to be WAN ports. For clarity, other elements corresponding to the storage network in the example shown in FIG. 3 have also been omitted (such as ports for connection between the host devices 1 and 2, and fabric and/or network switches and their corresponding ports).

Although not explicitly shown in FIG. 3, it is also assumed that a witness system 105 communicates with the various SAN elements in a similar manner as described herein in conjunction with FIG. 2, for example. Specifically, the witness system 105 may communicate with the SAN elements to coordinate planned disruptive events associated with the SAN elements using communication channels.

The storage network includes four data paths for each fabric from host device to the data of the distributed virtual LUN 305. The data paths for the fabric represented by the dotted arrows include data paths 320, 322, 324, and 326. The data paths for the other fabric represented by the solid arrows (not shown in FIG. 3) are similar to the data paths 320, 322, 324, and 326 except that alternate pairs of ports are used.

According to some embodiments, a system administrator may specify one or more minimum redundancy levels. For example, the system administrator may specify that the storage network in FIG. 3 should include a minimum of four data paths and a minimum of two data mirrors. In such embodiments, the witness system 105 can obtain and analyze information about the status of each component in the network to determine whether to approve or deny an action requested by a component. As an example, the witness system 105 may receive a request from a storage system component to perform an action that affects at least one of the redundancy levels. The witness system 105 then processes the request to determine whether the action is non-critical (for example, non-critical maintenance) or if it is critical for preventing data unavailability. If the action is non-critical, then the witness system 105 determines whether the minimum levels of redundancy will be satisfied after performing the action. If so, the witness system 105 approves the action by sending an acknowledgment to the distributed virtual LUN 305, for example. Otherwise, the witness system 105 denies the request (for example, by sending a NACK to the component). If the action is for preventing data unavailability, then the witness system 105 checks whether the action will bring down either the last remaining mirror or data path. If so, the witness system 105 denies or prevents the action.

By way of example, assume the distributed virtual LUN 305 sends a non-critical request to isolate physical LUN mirror 1, and that there are no failures or performance issues in the storage network. The witness system 105 determines that the action is non-critical, and that performing the action will cause only one data mirror to remain. The witness system 105 denies the request as the specified redundancy criteria (i.e., two mirrors) will not be satisfied after the action is performed.

Now assume that the request is critical to prevent data unavailability. The witness system 105 determines that four data paths (i.e., data paths 324, 326 and the corresponding data paths on the other fabric) will still be available to physical LUN mirror 2. Thus, the witness system 105 approves the request.

Now that physical LUN mirror 1 is isolated, the witness system 105 will deny any request for an action that would result in physical LUN mirror 2 being unavailable at least until physical LUN mirror 1 becomes available again.

Next, assume that physical LUN mirror 1 is still isolated and that the witness system 105 receives a request to isolate the WAN connection between port 10 of virtualization controller 306 and port 10 of virtualization controller 312. In this situation, if the request is critical, then the witness system 105 allows the request since data paths 324 and 326 would still be available. However, if the request is non-critical, then it would be denied as the number of data paths after the action would be two, which is less than the specified minimum level of four.

Figure 4:
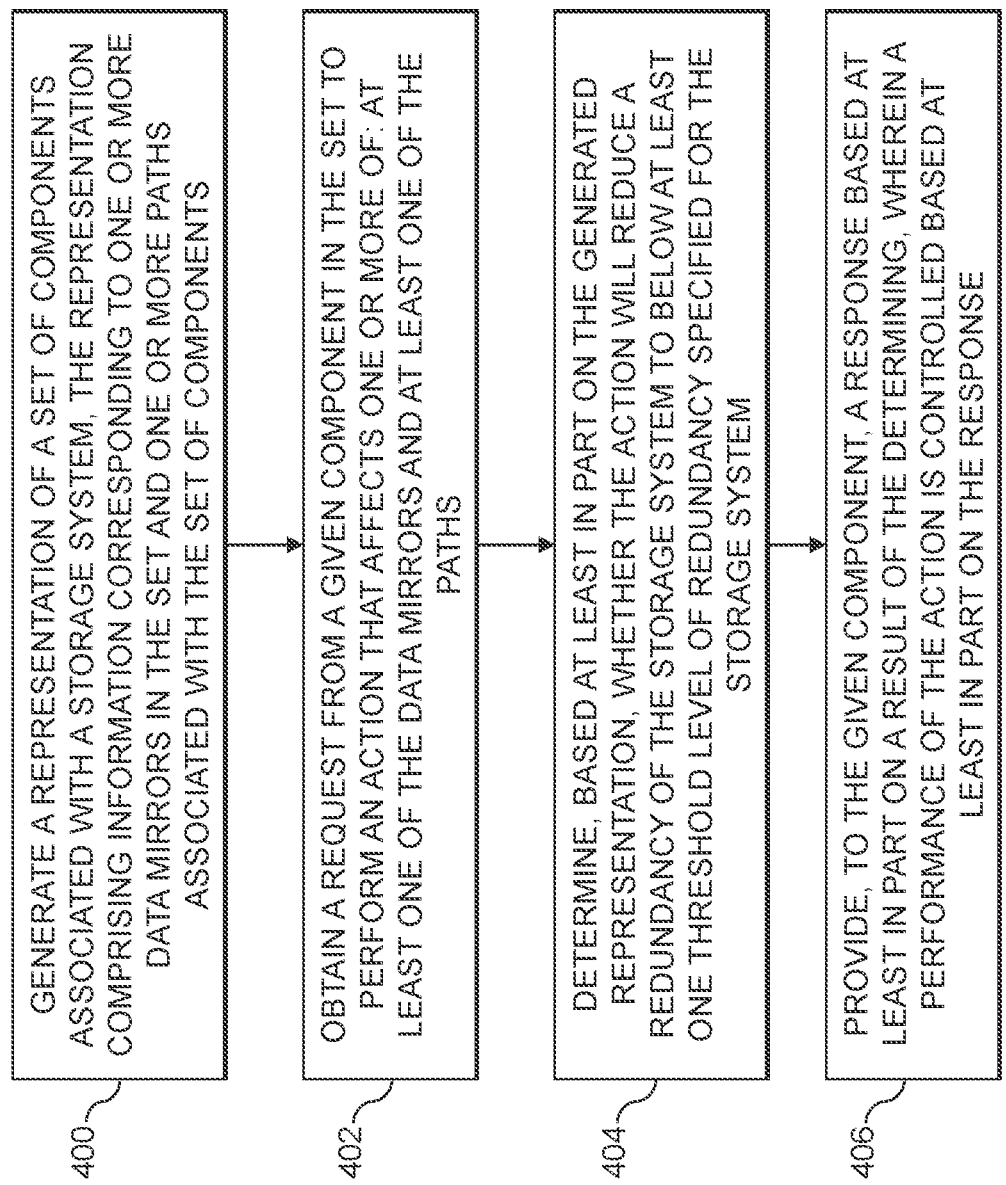
FIG. 4 is a flow diagram of a process for using a path and data witness to reduce data unavailability events in an illustrative embodiment.

FIG. 4 is a flow diagram of a process for coordinating storage system events using a path and data witness in an illustrative embodiment. It is to be understood that this particular process is only an example, and additional or alternative processes can be carried out in other embodiments.

In this embodiment, the process includes steps 400 through 406. These steps are assumed to be performed by the witness system 105 utilizing its modules 110, 112, and 114. Step 400 includes generating a representation of a set of components associated with a storage system, the representation comprising information corresponding to one or more data mirrors in the set and one or more paths associated with the set of components, wherein the one or more paths comprise one or more of: at least one data path and at least one control path. Step 402 includes obtaining a request from a given component in the set to perform an action that affects one or more of: at least one of the one or more data mirrors and at least one of the one or more paths. Accordingly, it is to be understood that the action referred to in step 402 can affect only data mirror(s), only path(s), or both data mirror(s) and path(s). Step 404 includes determining, based at least in part on the generated representation, whether the action will reduce a redundancy of the storage system to below at least one threshold level of redundancy specified for the storage system. Step 406 includes providing, to the given component, a response based at least in part on a result of the determining, wherein a performance of the action is controlled based at least in part on the response.

A given one of the one or more paths may be between a host device and one of the data mirrors. The result of the determining may include a determination that the action will reduce the redundancy of the storage system to below the at least one threshold level of redundancy, and the response may include a negative acknowledgment of the request to prevent the given component from performing the action. The result of the determining may include a determination that the action will not reduce the redundancy of the storage system to below the at least one threshold level of redundancy, and the response may include an acknowledgement of the request to allow the given component to perform the action. The process may include the following steps: receiving at least one notification from at least one component in the set related to an event that affects one or more of: at least one of the one or more data mirrors and at least one of the one or more paths; and storing information related to the event in a database. The determining may be based at least in part on the information stored in the database. The at least one threshold level of redundancy may be configurable and may correspond to one or more of: a number of the data mirrors; a number of physical paths to data of the storage system; and a number of virtual paths to data of the storage system. The representation may be generated using data collected by a cluster of controllers in a storage area network. The representation may be generated using data collected by storage resource management software associated with the storage system.

Figure 5:
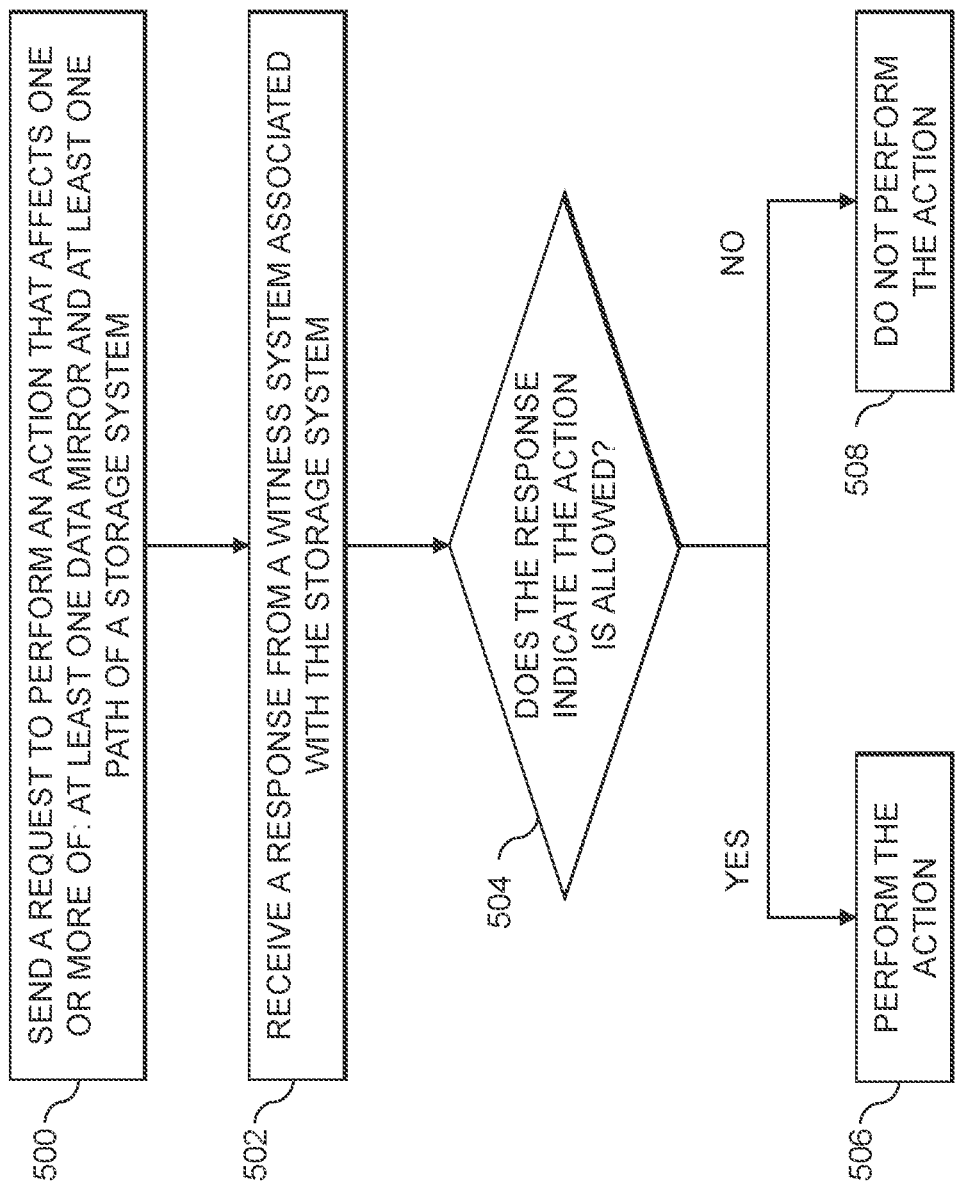
FIG. 5 is a flow diagram of another process for reducing data unavailability events in an illustrative embodiment.

FIG. 5 is a flow diagram of a process for coordinating storage system events using a path and data witness in an illustrative embodiment. It is to be understood that this particular process is only an example, and additional or alternative processes can be carried out in other embodiments.

In this embodiment, the process includes steps 500 through 508. These steps are assumed to be performed by a given component of a storage system (or a driver thereof).

Step 500 includes sending a request to perform an action that affects at least one data mirror or at least one data path of a storage system. Step 502 includes receiving a response from a witness system associated with the storage system. Step 504 includes a test to determine whether the action can be performed based on the response received at step 502. For example, the response can comprise an acknowledgement of the request to indicate that the action can be performed, or the response, in some embodiments, may comprise a negative acknowledgement to indicate that the action should not be performed. If the result of step 504 is yes, then step 506 includes performing the action. If the result of step 504 is no, then step 508 includes not performing the action. In one or more embodiments, if an unexpected event occurs that affects at least one data mirror or at least one data path of a storage system, then the given component can send a message to the witness system to inform the witness system of the affected data mirror or path of the storage system.

Accordingly, the particular processing operations and other functionality described in conjunction with each of the flow diagram of FIGS. 4 and 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to globally coordinate events between storage system elements based on a specified level of data and/or connection redundancy. These and other embodiments can help maintain user-specified redundancy levels and help prevent data unavailability events from occurring.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices, storage systems and witness systems with functionality for coordinating disruptive events will now be described in greater detail with reference to FIGS. 6 and 7. Although described in the context of system 100, these platforms may also be used to implement at least portions of other information processing systems in other embodiments.

Figure 6:
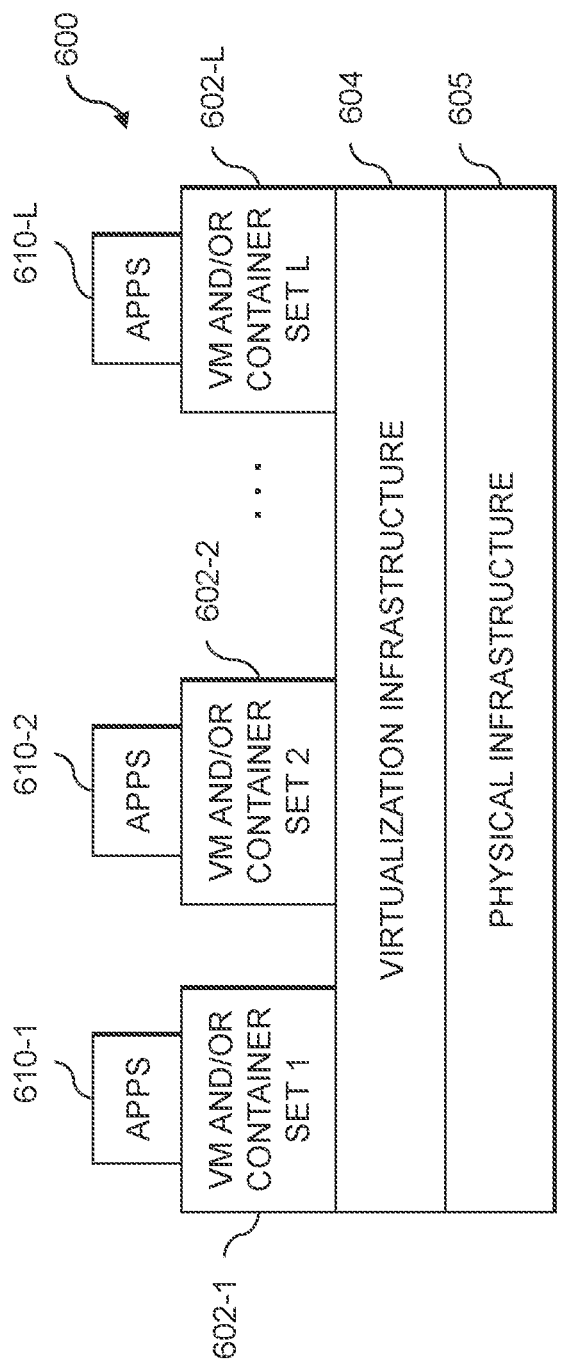
FIGS. 6 and 7 show examples of processing platforms that may be utilized to implement at least a portion of an information processing system in illustrative embodiments.
Figure 7:
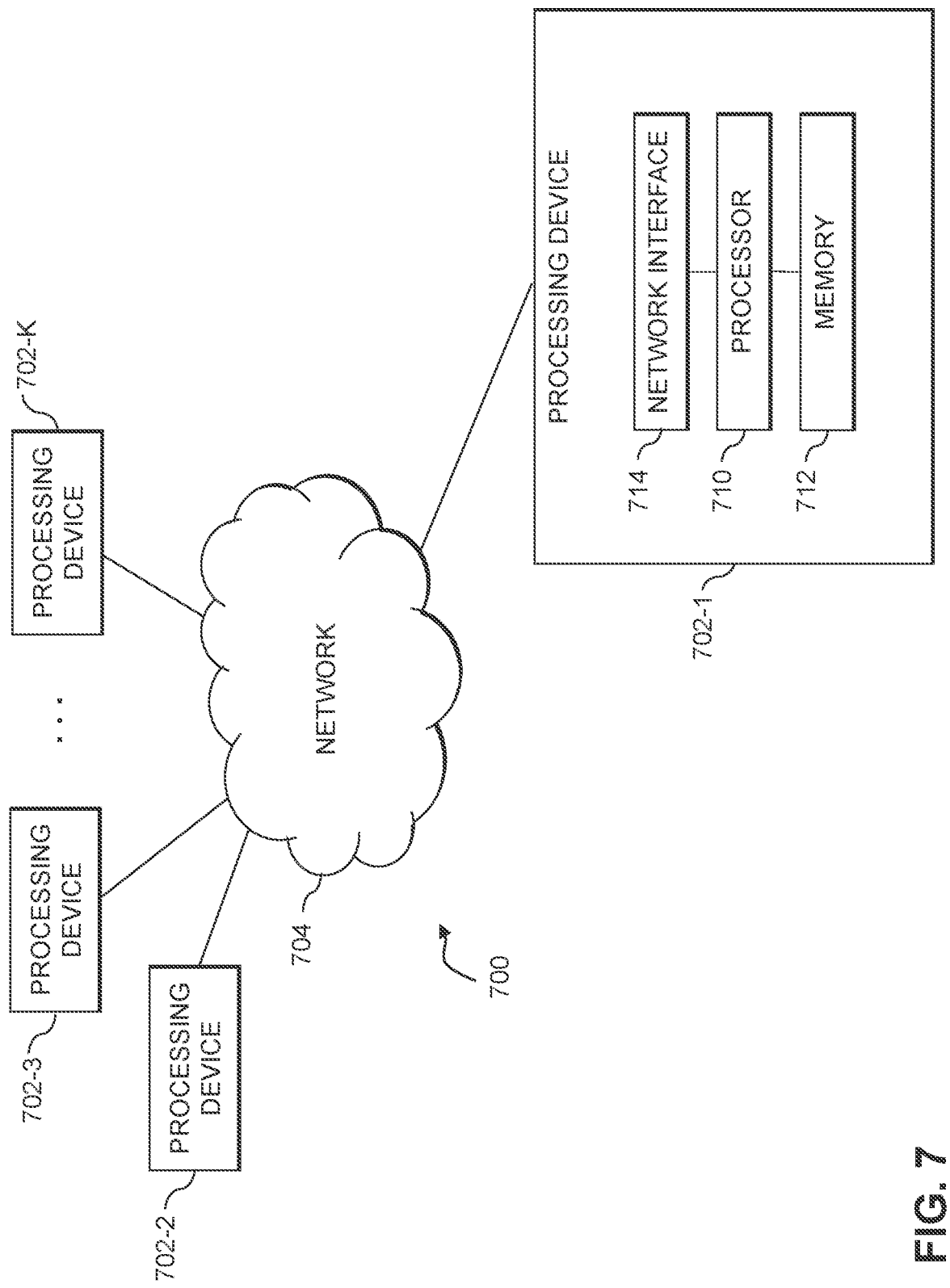

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for coordinating events in a storage system of the type described above using one or more processes running on a given one of the VMs. For example, each of the VMs can implement module 110, module 112, module 114, and/or other components for implementing functionality for coordinating events in the storage system 102.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for coordinating events in a storage system of the type described above. For example, a container host device supporting multiple containers of one or more container sets can implement one or more instances of the module 110, module 112, module 114, and/or other components for implementing functionality for coordinating events in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise RAM, read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™ VxRack™ FLEX, VxBlock™, or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components for coordinating events of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    generating a representation of a set of components associated with a storage system, the representation comprising information corresponding to one or more data mirrors in the set of components and one or more paths associated with the set of components, wherein the one or more paths comprise one or more of: at least one data path and at least one control path;
    obtaining a plurality of requests from a component in the set of components, wherein each request is a request for permission to perform a corresponding action;
    determining, in response to obtaining respective ones of the plurality of requests, whether the corresponding action is designated as critical or non-critical;
    in response to determining the corresponding action is designated as critical:
    determining, based at least in part on the generated representation, whether performing the corresponding action will result in a first unavailability state, wherein the first unavailability state comprises an unavailability of a last remaining data mirror and/or an unavailability of a last remaining data path in the storage system;
    providing, to the component, a first reply, in response to determining that performing the corresponding action would result in the first unavailability state, or a second reply, in response to determining that performing the corresponding action would not result in the first unavailability state, wherein the first reply comprises a negative acknowledgement to indicate that the corresponding action should not be performed and the second reply comprises the second reply comprises an acknowledgement to indicate that the corresponding action can be performed;
    in response to determining the corresponding action is designated as non-critical:
    determining, based at least in part on the generated representation, whether performing the corresponding action would result in a second unavailability state, where the second unavailability state comprises an unavailability of the one or more data mirrors below a data mirror threshold level and/or an unavailability of the one or more data paths below a data path threshold level in the storage system, wherein the data mirror threshold level is greater than one data mirror and the data path threshold level is greater than one data path;
    providing, to the component, the first reply, in response to determining that performing the corresponding action would result in the second unavailability state, or the second reply, in response to determining that performing the respective action would not result in the second unavailability state;
    wherein the plurality of requests comprises a first request for permission to perform an action designated as critical and a second request for permission to perform an action designated as non-critical, and wherein performance of the corresponding action by the component is allowed or prevented based at least in part on the first reply or the second reply;
    wherein the method is performed by at least one processing device comprising a hardware processor.

2. The computer-implemented method of claim 1, wherein a given one of the one or more paths is between a host device and one of the one or more data mirrors.

3. The computer-implemented method of claim 1, wherein the determining whether performing the corresponding action would result in the first unavailability state and/or the determining whether performing the corresponding action would result in the second unavailability state comprises:
    generating a data structure based at least in part on a simulation of the corresponding action with respect to the generated representation.

4. The computer-implemented method of claim 3, comprising:
    receiving at least one notification from at least one other component in the set of components related to a scheduled event that affects one or more of: at least one of the one or more data mirrors and at least one of the one or more paths; and
    storing information related to the scheduled event in a database.

5. The computer-implemented method of claim 4, wherein the data structure is generated based at least in part on the information stored in the database, and wherein the computer-implemented method further comprises:
    coordinating the scheduled event and the performance of the corresponding action by the component based on the data structure.

6. The computer-implemented method of claim 3, wherein:
    the set of components corresponds to one or more first computing nodes associated with a storage system;
    the simulation is performed by at least one second computing node that is different than the one or more first computing nodes; and
    performing the simulation comprises cloning the representation of the set of components and simulating the corresponding action on the cloned representation of the set of components.

7. The computer-implemented method of claim 3, wherein the data structure comprises information corresponding to the component and at least one of the one or more paths associated with the action.

8. The computer-implemented method of claim 1, wherein the data mirror threshold level and/or the data path threshold level are configurable, and wherein the data path threshold level corresponds to one or more of:
    a number of physical paths to data of the storage system; and
    a number of virtual paths to data of the storage system.

9. The computer-implemented method of claim 1, wherein the representation is generated using data collected by a cluster of controllers in a storage area network.

10. The computer-implemented method of claim 1, wherein the representation is generated using data collected by storage resource management software associated with the storage system.

11. A non-transitory processor-readable storage medium having stored therein program code of one or more software programs, wherein the program code when executed by at least one processing device causes the at least one processing device:
to generate a representation of a set of components associated with a storage system, the representation comprising information corresponding to one or more data mirrors in the set of components and one or more paths associated with the set of components, wherein the one or more paths comprise one or more of: at least one data path and at least one control path;
to obtain a plurality of requests from a component in the set of components, wherein each request is a request for permission to perform a corresponding action;
to determine, in response to obtaining respective ones of the plurality of requests, whether the corresponding action is designated as critical or non-critical;
in response to determining the corresponding action is designated as critical:
to determine, based at least in part on the generated representation, whether performing the corresponding action will result in a first unavailability state, wherein the first unavailability state comprises an unavailability of a last remaining data mirror and/or an unavailability of a last remaining data path in the storage system;
to provide, to the component, a first reply, in response to determining that performing the corresponding action would result in the first unavailability state, or a second reply, in response to determining that performing the corresponding action would not result in the first unavailability state, wherein the first reply comprises a negative acknowledgement to indicate that the corresponding action should not be performed and the second reply comprises the second reply comprises an acknowledgement to indicate that the corresponding action can be performed;
in response to determining the corresponding action is designated as non-critical:
to determine, based at least in part on the generated representation, whether performing the corresponding action would result in a second unavailability state, where the second unavailability state comprises an unavailability of the one or more data mirrors below a data mirror threshold level and/or an unavailability of the one or more data paths below a data path threshold level in the storage system, wherein the data mirror threshold level is greater than one data mirror and the data path threshold level is greater than one data path;
to provide, to the component, the first reply, in response to determining that performing the corresponding action would result in the second unavailability state, or the second reply, in response to determining that performing the respective action would not result in the second unavailability state;
wherein the plurality of requests comprises a first request for permission to perform an action designated as critical and a second request for permission to perform an action designated as non-critical, and wherein performance of the corresponding action by the component is allowed or prevented based at least in part on the first reply or the second reply.

12. The non-transitory processor-readable storage medium of claim 11, wherein a given one of the one or more paths is between a host device and one of the one or more data mirrors.

13. The non-transitory processor-readable storage medium of claim 11, wherein the determining whether performing the corresponding action would result in the first unavailability state and/or the determining whether performing the corresponding action would result in the second unavailability state comprises:
generating a data structure based at least in part on a simulation of the corresponding action with respect to the generated representation, wherein the data structure comprises information corresponding to the component and at least one of the one or more paths associated with the action.

14. The non-transitory processor-readable storage medium of claim 13, wherein the at least one processing device is further caused:
to receive at least one notification from at least one other component in the set of components related to a scheduled event that affects one or more of: at least one of the one or more data mirrors and at least one of the one or more paths;
to store information related to the scheduled event in a database, wherein the data structure is generated based at least in part on the information stored in the database; and
to coordinate the scheduled event and the performance of the corresponding action by the component based on the data structure.

15. The non-transitory processor-readable storage medium of claim 13, wherein:
the set of components corresponds to one or more first computing nodes associated with a storage system;
the simulation is performed by at least one second computing node that is different than the one or more first computing nodes; and
performing the simulation comprises cloning the representation of the set of components and simulating the corresponding action on the cloned representation of the set of components.

16. The non-transitory processor-readable storage medium of claim 11, wherein the data mirror threshold level and/or the data path threshold level are configurable, and wherein the data path threshold level corresponds to one or more of:
a number of physical paths to data of the storage system; and
a number of virtual paths to data of the storage system.

17. An apparatus comprising:
at least one processing device comprising a processor coupled to a memory;
the at least one processing device being configured:
to generate a representation of a set of components associated with a storage system, the representation comprising information corresponding to one or more data mirrors in the set of components and one or more paths associated with the set of components, wherein the one or more paths comprise one or more of: at least one data path and at least one control path;
to obtain a plurality of requests from a component in the set of components, wherein each request is a request for permission to perform a corresponding action;

to determine, in response to obtaining respective ones of the plurality of requests, whether the corresponding action is designated as critical or non-critical;

in response to determining the corresponding action is designated as critical:
- to determine, based at least in part on the generated representation, whether performing the corresponding action will result in a first unavailability state, wherein the first unavailability state comprises an unavailability of a last remaining data mirror and/or an unavailability of a last remaining data path in the storage system;
- to provide, to the component, a first reply, in response to determining that performing the corresponding action would result in the first unavailability state, or a second reply, in response to determining that performing the corresponding action would not result in the first unavailability state, wherein the first reply comprises a negative acknowledgement to indicate that the corresponding action should not be performed and the second reply comprises the second reply comprises an acknowledgement to indicate that the corresponding action can be performed;

in response to determining the corresponding action is designated as non-critical:
- to determine, based at least in part on the generated representation, whether performing the corresponding action would result in a second unavailability state, where the second unavailability state comprises an unavailability of the one or more data mirrors below a data mirror threshold level and/or an unavailability of the one or more data paths below a data path threshold level in the storage system, the data mirror threshold level is greater than one data mirror and the data path threshold level is greater than one data path;
- to provide, to the component, the first reply, in response to determining that performing the corresponding action would result in the second unavailability state, or the second reply, in response to determining that performing the respective action would not result in the second unavailability state;

wherein the plurality of requests comprises a first request for permission to perform an action designated as critical and a second request for permission to perform an action designated as non-critical, and wherein performance of the corresponding action by the component is allowed or prevented based at least in part on the first reply or the second reply.

18. The apparatus of claim 17, wherein a given one of the one or more paths is between a host device and one of the one or more data mirrors.

19. The apparatus of claim 17, wherein the determining whether performing the corresponding action would result in the first unavailability state and/or the determining whether performing the corresponding action would result in the second unavailability state comprises:
generating a data structure based at least in part on a simulation of the corresponding action with respect to the generated representation, wherein the data structure comprises information corresponding to the component and at least one of the one or more paths associated with the action.

20. The apparatus of claim 19, wherein the at least one processing device is further caused:
- to receive at least one notification from at least one component in the set of components related to scheduled event that affects one or more of: at least one of the one or more data mirrors and at least one of the one or more paths;
- to store information related to the scheduled event in a database, wherein the data structure is generated based at least in part on the information stored in the database; and
- to coordinate the scheduled event and the performance of the corresponding action by the component based on the data structure.

* * * * *